United States Patent [19]

Stanley et al.

[11] Patent Number: 4,653,045
[45] Date of Patent: Mar. 24, 1987

[54] INTERACTIVE FACILITY CONTROL ARRANGEMENT

[75] Inventors: Keith R. Stanley, Winfield; David F. Winchell, Glen Ellyn, both of Ill.

[73] Assignee: AT&T Bell Laboratories, Murray Hill, N.J.

[21] Appl. No.: 702,389

[22] Filed: Feb. 15, 1985

[51] Int. Cl.[4] .............................................. H04J 3/12
[52] U.S. Cl. ...................................... 370/62; 379/203
[58] Field of Search ............. 179/18 BC, 2 DP, 18 B; 370/62

[56] References Cited

U.S. PATENT DOCUMENTS

4,317,960 3/1982 Johnson et al. ................. 179/18 BC
4,317,961 3/1982 Johnson .......................... 179/18 BC
4,475,189 10/1984 Herr et al. .............................. 370/62

Primary Examiner—Douglas W. Olms
Assistant Examiner—Kenneth I. Rokoff
Attorney, Agent, or Firm—Richard J. Godlewski

[57] ABSTRACT

A communication network is disclosed having a customer interactive special service facility, such as a conference arrangement. At the customer's request, or if trouble is encountered, an operator position is alerted with the identity of the special service facility. Using this identity, the operator can cause the status of the special service facility to be displayed at the operator's position and thereafter exercise control over the facility.

14 Claims, 12 Drawing Figures

T/C INFORMATION DATA TABLE

| REASON FOR REQUEST | ACCESS STATUS | T/C LOC | BRDG TYPE / ID | PORTS REQUESTED / PORTS AVAILABLE |
|---|---|---|---|---|
| CONTROLLER OPTIONS | | | LAST DIGITS DIALED | |
| LEG. ID | STATUS | AUDIO LOCATION | NAME | T/C OPR NOTES |
| 1 | PRIV | X0/1X-XXX-XXXX | HOST | |
| 2 | ONCNF | 212-555-1234 | DOE | |
| 3 | ONCNF | 212-555-1234 | ROE | |
| 4 | DROPPED | 212-555-5678 | SMITH | |
| | | | | |

TOSS STATE DIAGRAM

INTERACTIVE FACILITY CONTROL ARRANGEMENT

TECHNICAL FIELD

This invention relates to communication systems, and particularly to systems which automatically interact with customers to provide special services.

In a more particular aspect, this invention relates to method and apparatus for providing operator assistance to customers using interactive communication systems.

In a still more particular aspect, this invention relates to arrangements for providing operator assistance to customers using an interactive conference arrangement.

BACKGROUND OF THE INVENTION

In a communications network many special services are furnished under the direct control of the customer, and a customer who may be unfamiliar with the operation of a system is prompted automatically by machine generated announcements. Thus, in these systems each time a customer initiates an action, the system prompts the customer as to the next action to be taken.

These systems are referred to herein as interactive systems. An example of such a system is found in U.S. Pat. No. 4,475,189 entitled, "Automatic Interactive Conference Arrangement", which issued to D. E. Herr et al on Oct. 2, 1984.

In the Herr et al arrangement the conference controller, or host, could summon an operator by temporarily disconnecting from the bridge and keying the digit "0" using a touch-tone key set at the controller's station. In response to the digit "0", the conference arrangement would establish an audio connection to an operator's position. Since the operator's position was similarly equipped with a touch-tone key set, the operator could summon additional conferees or join the conference using the audio channel as one leg of the conference bridge. Also, while talking to the host in a privacy mode, the operator could further instruct the host as to the proper use of the conference facility.

While the Herr et al arrangement is wholly suitable for its intended purpose, the audio connection to the operator's position merely gives the operator the same control capability as the conference host and does not inform the operator of the detailed status of the conference.

SUMMARY OF THE INVENTION

The foregoing problem is solved and technical advance is achieved by method and apparatus for presenting to an operator the current status of an interactive special service facility and permitting the operator to exchange data messages with the special services facility thereby exercising control over the facility.

More specifically and in accordance with the illustrative embodiment of the invention, a special service facility, such as an interactive conference arrangement, is served by an operator's position via separate audio and data links.

In response to a request from the conference host or, in the event of an irregularity in the operation of the conference facility, an audio channel is established to the operator's position.

Data processing apparatus in the special service facility identifies the conference that is requesting operator assistance and transmits the conference identity over the audio channel. Furthermore, the processing apparatus assembles data relevant to the current status of the conference and transmits the details of the conference over the data link to another data processor associated with the operator's position.

When the operator answers the audio channel, the identification of the conference is announced to the operator. The operator thereafter keys into the operator's position the conference identification number in order to display the details of the conference.

In the specific embodiment disclosed herein, the operator is informed of the status of the conference by a display on a video display terminal. The detailed status of the conference includes such items as the identity of the conference, the identity of each conferee on each leg, the reason the operator was called, who called the operator, the dialing options available to the conference host when the operator was called, etc. Utilizing a cursor on the screen of the terminal and the accompanying keyboard the operator can exercise control over the individual conferees on the bridge or summon additional conferees to the bridge.

DETAILED DESCRIPTION

Figure 1:
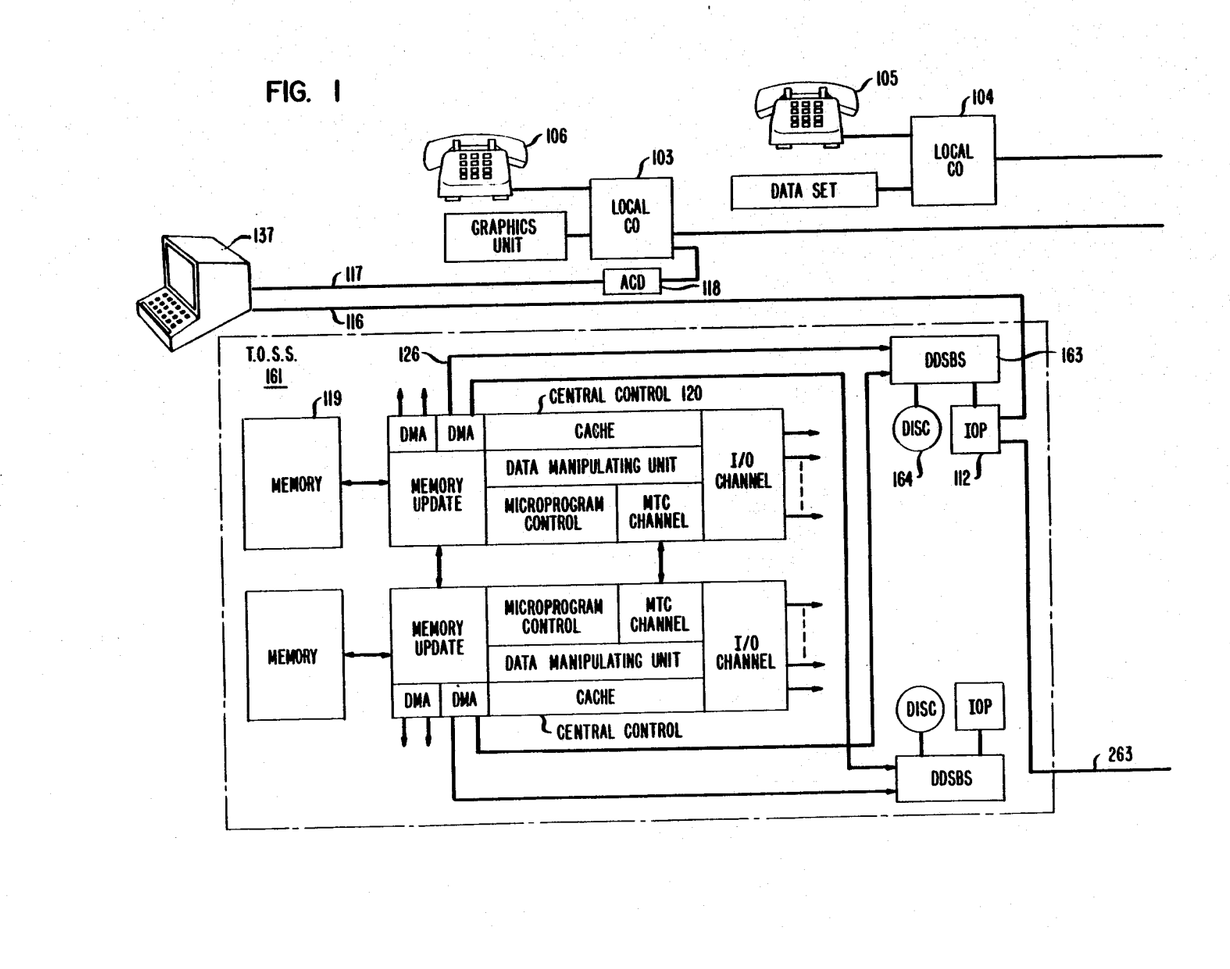
FIGS. 1 and 2, when arranged according to FIG. 12, show a block diagram of a typical telephone network having an interactive conference arrangement with the teleconference operator support system connected thereto.
Figure 2:
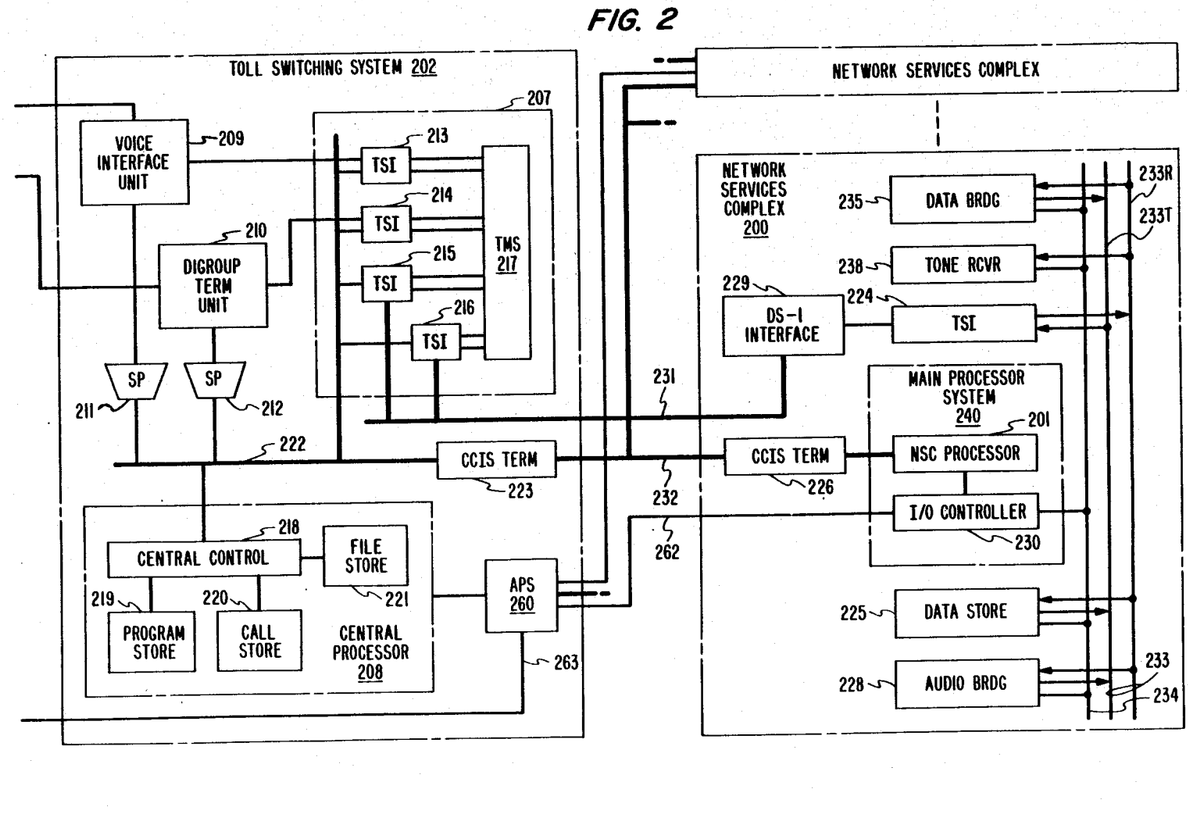

The general organization of a system employing the invention is illustrated in the block diagram of FIGS. 1 and 2 which show a typical communications network having a toll switching system 202 which serves local telephone central offices 103 and 104. Central offices 104 and 103 contain the switching apparatus for providing telephone service to customer stations 105 and 106, respectively. Connected to switching system 102 is teleconference operator support system 161 serving operator position 137. Also connected to switching system 202 is a plurality of network services complexes, such as 200.

Network services complex 200 is an interactive special service facility which includes a main processor system 240, data store system 225, audio bridge system 228, data bridge system 235, tone receiver system 238 and other units. As will be described in more detail below, one of the functions of complex 200 is to provide interactive conferencing with announcements and instructions to customers over the telephone network via the toll and local switching offices.

Toll switching system 202, as depicted in FIG. 2, is a typical switching system, such as the electronic switch described in detail in the *Bell System Technical Journal*, Vol. 56, No. 7, September 1977, and need not be fully described herein for the reader to understand the present invention.

Switching system 202 comprises a network 207, a central processor 208, voice interface unit 209, a digroup terminal unit 210, signal processors 211 and 212, attached processor system 260 and miscellaneous equipment units that have not been shown to simplify the drawing.

Network 207 has a time-space-time switching configuration utilizing time slot interchange (TSI) units 213-216, and time multiplexed switch (TMS) unit 217.

Access to the switching network 207 is via serial pulse code modulation links each accommodating 120 voice channels. However, central offices 103 and 104 can be connected to toll switching system 202 via analog or digital transmission facilities. Thus, as seen in FIGS. 1 and 2, local central office 103 is connected to the toll office over the digital facilities which terminate in digroup terminal unit 210, while local office 104 is connected via analog trunks to voice interface unit 209. Digroup terminal 210 performs the multiplexing and demultiplexing between the interoffice transmission facilities and network 207 and also processes signaling information via signal processor 212.

The analog trunks are terminated in a voice interface unit such as 209 whose principal function is analog-to-digital conversion (and vice versa) plus formating digital data for the TSI units. Voice interface unit 209 communicates with the central control via signal processor 211.

Signal processor 211 provides the scan, distribute and digit reception tasks for analog trunks, while signal processor 212 performs the equivalent tasks for the digital trunks except that instead of physical scan and distribution points, the supervisory states of each trunk are stored in a memory in the signal processor.

The majority of the logic, control, storage and translation functions required for the operation of the toll switching system are performed by central processor 208. A typical processor suitable for use in the illustrative toll switching system is described in the *Bell System Technical Journal*, Vol. 56, No. 2, February 1977.

Central control 218 is the information processing unit of the system and executes the program instructions resident in program store 219 using the call processing data in call store 220. Central control 118 communicates with the peripheral units via bus 222.

Switching system 202 is also equipped with an attached processor system 260 which directly interfaces with central processor 208 and the input/output controller in each network services complex served by the switching system. Among its many functions, the attached processor 260 performs certain maintenance and administrative tasks for switching system 202. In addition, the attached processor system 260 provides a means for exchanging data between the teleconference operator support system 161 and the many network services complexes.

As mentioned above, interoffice signaling information is extracted from the transmission paths of analog and digital trunks by signal processors 211 and 212, respectively, and used by central control 218 for call processing. However, the signaling for certain trunks may be transmitted between the offices over a common data link separate from the transmission paths using a common channel interoffice signaling system. A typical common channel interoffice signaling system is described in the *Bell System Technical Journal*, Vol. 57, No. 2, February 1978, and is represented herein by CCIS blocks 223 and 226 and data link 232.

Coupled to the toll switching system is a plurality of interactive special service systems, such as network services complex 200. Complex 200, which is typical of all complexes, comprises a main processor system 240, a data bridge system 235, an audio bridge system 228, CCIS terminal 226, DS-2 interface 229, time slot interchange 224, data store announcement system 225 and a tone receiver system 238. Network services complex 200 can also include other units such as additional conferencing bridges, speech recognition systems, data processing units, etc.

The network services complex is disclosed in U.S. Pat. No. 4,475,189 which issued on Oct. 2, 1984 to D. E. Herr, R. Metz, L. E. Suk, P. R. Wiley and D. F. Winchell and the reader is directed to that disclosure for a more detailed description of the network services complex. In order to appreciate how the present invention is utilized in a system having a network services complex, a brief overview of the complex and its various subsystems will be given herein, but it will be obvious to one skilled in the art that the present invention is equally applicable to other interactive systems without departing from the spirit and scope of the invention.

It is intended that network services complex 200 function with many different types of switching systems to provide several special services in addition to those mentioned above. As such, complex 200 has been designed to connect to a switching system via conventional interoffice trunks 231 and a CCIS type data link 232. The interoffice trunks 231 serving complex 200 are digital facilities similar to the trunks between toll office 202 and local office 203 as described above, and the data link 232 and its terminals are similar to those described in the 1978 *Bell System Technical Journal* cited above. Although these terminals are referred to as CCIS terminals, it is not essential that they be integrated in the CCIS signaling system used for call processing in the network. Complex 200 is also coupled to the teleconference operator support system 161 via attached processor system 260 and data links 262 and 263. It is via this data path that information can be exchanged between an operator at position 137 and the network services complex.

The network services complex is modularly designed to allow for various service units to be added. All units are interconnected over a data bus 233 and a control bus 234. The control bus is used by the NSC processor 201 to communicate control, status and error information with the various units in the complex. Program associated data, billing data, etc., which is distinguished from customer data to be conferenced, is also transmitted over control bus 234. Data bus 233, which conveys the customer data to be conferenced, consists of a transmit bus and a receive bus, and each bus is a 256 time slot, time-multiplexed PCM data bus.

Interface 129 connects the T1 trunks from toll switching system 202 to time slot interchange unit 224 which, under the direction of processor 201, switches any time slot in the receive T1 bus or the transmit portion of data bus 233 with any time slot on the T1 transmit bus or the receive portion of data bus 233. Thus, the interface 229, time slot interchange 224, and data bus 233 provide the path for the exchange of voice, conference data, announcements and inband signaling between the toll switching system 202 and units of the network services complex.

The network services complex 200 is controlled by a main processor system 201 which performs or initiates all call processing, maintenance, fault recovery, diagnostics and audits for the entire complex. Processor 201 also interfaces with terminal 226 to transmit and receive messages from the host toll switching system 202, and communicates with the teleconference operator support system 161 via I/O controller 230 and the previously described data path including links 262 and 263 and attached processor system 260.

As mentioned above, the network services complex can be equipped to furnish many interactive services. For purposes of illustration, let it be assumed that the complex is equipped for conferencing with voice prompting. Accordingly, the complex comprises an audio bridge system 228 which is used for combining the digital voice samples of speakers on a conference for distribution to other participants of the conference. Data bridge system 235, on the other hand, receives data from each conferee's data terminal and distributes the data to the other conferees at the correct speed, in the proper format, etc. The term, data, when used with respect to information transmitted by a customer, is meant to include digital representation of video signals, facsimile, signals from devices such as electronic chalk boards, etc., which is separate from the voice and tone signals transmitted by the customer.

Network services complex 200 also includes a data store system 225 for furnishing tones and announcements to instruct the customers in the use of the special services, and a tone receiver system 238 which receives the tone signals representing digits generated by the customer in controlling a conference.

The control interface between the network services complex system and the toll switching system 202 for call set-up is via a main processor system 240. It is via the main processor system that orders are exchanged between the network services complex and the toll switching system and between the network services complex and the teleconference operator support system.

DS-1 interface 239 in this embodiment provides an interface for up to five T1 trunks (120 channels or time slots) which terminate on time slot interchange unit 224. The time slot interchange unit, in turn, functions to switch these circuits with 256 time slots on time multiplexed data bus 233 to interconnect the channels with the various service units in network services complex. Thus, voice, customer data, and signaling information incoming over the toll telephone network from a conferee is forwarded via interface 229, and time slot interchange 224 to the audio and data bridges for conferencing or to the tone receiver for digit detection and collection, while announcements and tones from data store system 225 and conference data from the bridges are transmitted back via the time slot interchange over the toll network to the conferees.

While the interactive conference service provided by the network services complex is intended to be operated and controlled entirely by the user in response to announcement prompts, a need occasionally arises wherein the customer requires the assistance of an operator who is more familiar with the operation of the interactive facility. This could occur if the host of the conference fails to react to a prompt in the correct manner or if a trouble condition is encountered in the system. Also, the host can summon the operator through the use of a key set at the host's station.

To assist in the use of the special services facility, teleconferencing operator support system 161 and operator positions such as 137 are provided. Teleconferencing operator support system 161 contains a general purpose computer which is connected via its input/output processor over data link 263 to the attached processor system 260 at toll switching system 202. The teleconferencing operator support system 161 also communicates with operator positions such as 137 via input/output processor 112 and data link 116.

A typical general purpose processor suitable for use with the teleconferencing operator support system 161 and the attached processor system 260 is the 3B20 processor manufactured by AT&T Technologies, Inc., and described in the January 1983 issue of the *Bell System Technical Journal*, Vol. 62, No. 1, Part II. As set forth in the technical journal, the 3B20 processor is a 32 bit machine comprising a central control, memory, and input/output systems. While the processor as shown in FIG. 1 and in the cited technical journal operates in a duplex mode, it will be obvious to one skilled in the art that a similar processor functioning in a simplex mode would be equally suitable for use in the teleconferencing operator support system 161 and the attached processor system 260.

Communication by the direct memory access circuits 126 of the central control to and from the peripheral devices is accomplished via a duplex dual-serial bus selector 163, which in the case of a duplex processor allows both processors to access a single device. Some of the typical devices that can be accessed via bus selector 163 are disk system 164, input/output processor 112, scan and distribute points, etc.

The input/output processor provides for a wide range of data link facilities by supporting many microprocessor-based peripheral controllers which are programmed to handle a specific terminal or device. Also, the scanner/distributor capability is useful in monitoring and controlling equipment states or peripheral circuits. It is via the peripheral controllers and the scan and distribute points that the teleconferencing operator support system 161 can communicate with and determine the status of the terminals at operator position 137 and the attached processor system 260.

The terminal at position 137 can be any standard asynchronous video display terminal which generates and displays characters utilizing the ASCII code. Examples of terminals suitable for use with this arrangement are the VT100 manufactured by Digital Equipment Corporation, the Hewlett Packard Model 2621B, and many other terminals known to those skilled in the art.

In addition to the standard video display terminal alphanumeric keyboard, position 137 is equipped with a pluality of special function keys, which will be described below, an operator's headset, and a touch-tone key set for transmitting dual tone multifrequency signals over an audio link.

To illustrate the overall operation of the interactive special service facility and particularly how operator assistance is furnished to the facility, a description of a conference call using the network services complex will now be given.

Conference calls can be established in a "meet me" fashion by having all conferees dial an access code at a prearranged time and meet on the same conference bridge. On the other hand, the network services complex is equipped to handle conferences of the dial-up variety wherein a conference host or controller establishes a connection to the audio bridge and thereafter dials the directory numbers of the other conferees to be added to the bridge. With either arrangement, a touchtone receiver is coupled to the host's audio channel so the host can exercise control over the conference.

As noted above and with reference to FIG. 5, the operator can be summoned to a conference under various circumstances. For example, should a trouble condition occur during a conference or should the host disconnect (box 500), the network services complex would automatically summon the operator. On the other hand, the host can summon the operator by actuating the pound or number sign (#) to disconnect from the bridge and then transmitting the digit "0" (boxes 503 and 504).

Figure 5:
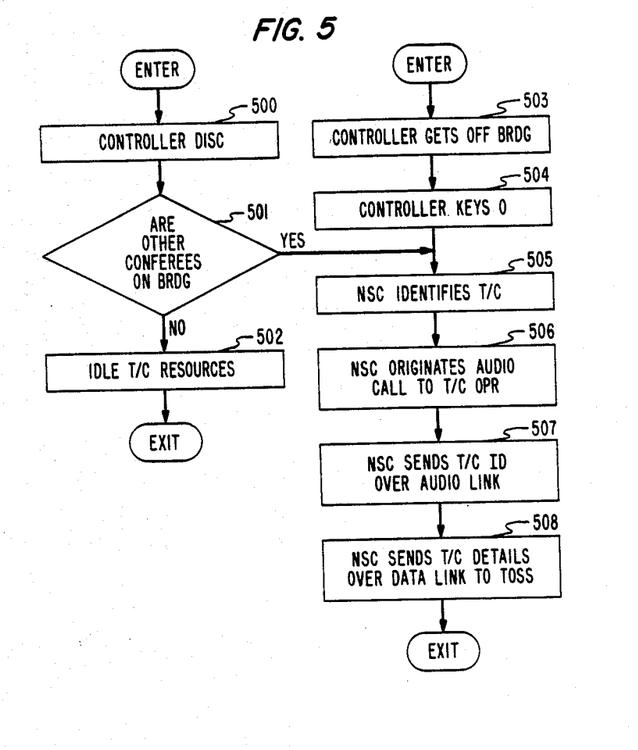
FIGS. 5-11 are flow diagrams depicting the overall operation of the system.

The network services complex processor 201 recognizes the digit "0" and interrogates its memory to identify the teleconference and ascertains the telephone number of the operator who will provide assistance (box 505). Processor 201 then sends a message over data link 232 to toll switching system 202 requesting that the switching system establish an audio connection via the telephone network to operator position 137 as set forth in box 506.

Prior to this, the operator at position 137 has plugged in a headset, activated the video display terminal thereat and logged into the computer system of teleconferencing operator support system 161. Once the operator has properly logged in, the position console will appear available to the automatic call distributor 118 (FIG. 1), and the operator can process incoming calls, place outgoing calls, or provide assistance to active conferences.

The automatic call distributor 118 provides a means for distributing all incoming calls to several operator positions such as position 137 depending on the availability of such positions during various load conditions.

Figure 11:
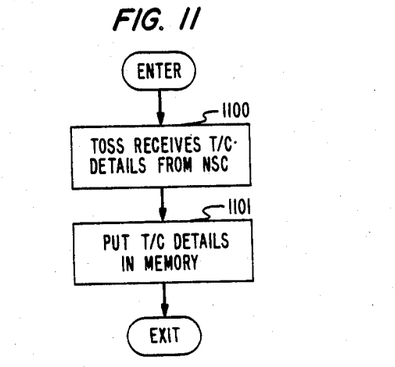
Figure 12:
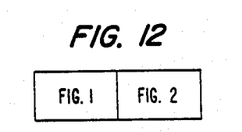

In addition to ordering the audio connection, network services complex processor 201 identifies the conference for which assistance has been requested and sends the details of the conference to the teleconferencing operator support system (as shown in box 508) via data link 262, attached processor system 260, and data link 263. The teleconferencing operator support system 161 processor receives the details of the conference and stores the information in its memory 119 for subsequent use as depicted by the flow diagram of FIG. 11.

Every conference known to the teleconferencing operator support system 161 occupies a portion of memory 119 associated with central control 120. A conference becomes known to the teleconferencing operator support system if the operator at position 137 had originated the conference and had input the conference data from the position terminal. Similarly, a conference becomes known to the teleconferencing operator support system when the operator is summoned by the network services complex, and the network services complex forwards the details of the conference over the above-described data link.

Figure 3:
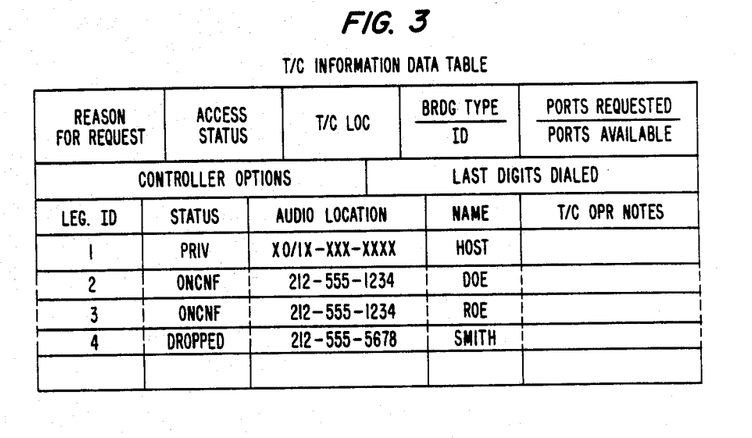
FIG. 3 is a pictorial representation of a portion of the memory in the teleconference operator support system.

FIG. 3 is a graphical representation of a portion of the conference details that are stored in memory 119. At the appropriate time this information will be displayed in a similar manner to the operator on the video display terminal of the operator's position.

As shown in FIG. 3, the information sent to take teleconferencing operator support system 161 includes the reason for requesting the assistance of the operator, i.e., whether the operator was summoned by the conference host, the host disconnected, the host made an error, etc. The access status information includes whether the operator or controller accessed the bridge. Also included in the conference details are the location of the bridge, the type of bridge (audio or graphics) and the conference identification. Insofar as the individual bridges are concerned, the details of the number of ports requested and the number of ports available information is sent to the teleconferencing operator supports system 161. The conference details also include the last digits dialed by the host and the dialing options that were available to the host when the operator was summoned. This permits the operator to further evaluate what state the conference was in when the operator was summoned.

The operator is also informed of the details of each leg including the leg identification, the status of each leg (i.e., whether the leg was on the conference, in a privacy mode or has disconnected), which leg is the host, the directory number of the station associated with each leg, and the name of the party on the leg. This last item can be entered by the operator when the conference is established by the operator. Also included in the conference details for each leg can be miscellaneous notes inserted by the operator.

Of course, it will be obvious by one skilled in the art that other conference details such as billing information, etc., can be included in the teleconferencing information data table depicted in FIG. 3.

At this point in the call being described, the network services complex has requested that the toll switching system originate an audio connection to automatic call distributor 118, and the network services complex has sent the details of the conference to the teleconferencing operator support system 161 over data links via the attached processor system 260. NSC processor 201 also orders a touch-tone receiver to be coupled to the audio connection to receive any digits transmitted by the operator.

Figure 6:
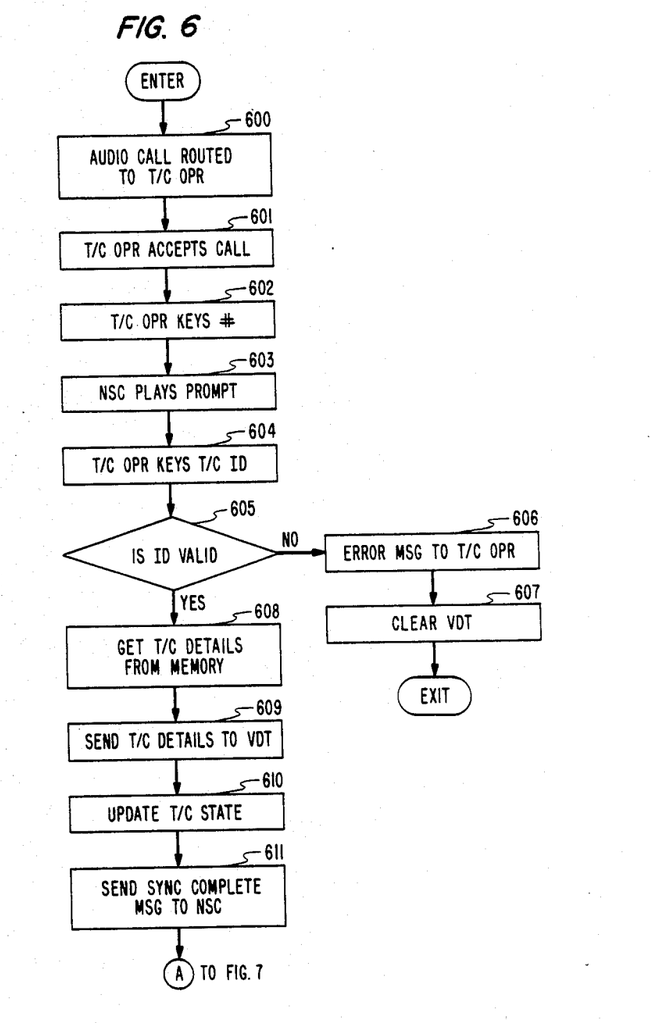

As shown in FIG. 6 the audio call is routed via the automatic call distributor 118 to an available operator position, and the operator is informed of the call by a zip tone heard in the operator's head set. The operator then accepts the call and actuates the pound (#) key (box 602) on the position to send an answer signal back to the network services complex 200. The network services complex processor recognizes the answer signal and orders data store 225 to play a message prompt to the operator (box 603). This message includes the network services complex identification and the bridge identification and will be used by the operator to request the display of the conference details on the video display terminal of operator position 137.

Upon hearing the conference identification, the operator enters the information into the terminal which then transmits the messsage via data link 116 to central control 120. Central control 120 then interrogates its memory 119 to ascertain if this is a valid identification as shown in box 605. If the central control does not have a record of this conference in its memory, it sends an error message which is displayed on the operator's video display terminal as shown in box 606. The video display terminal screen is then cleared and this portion of the program is exited. The operator can then ask the network services complex to verify the identifications which were sent to the operator. If the conference identification which was entered by the operator is valid as indicated by the execution of the "yes" branch of box 605, the processor extracts the conference details from memory 119 and sends them to the video display terminal at position 137 as set forth in boxes 608 and 609. Central control 120 then updates the conference status and sends a "synchronization complete" message to the network services complex (box 611).

The above-described synchronization procedure permits any available operator to assist on any conference and be apprised on the status of the conference despite what transpired between the conferees and any prior operator that had been summoned to assist them.

The operator's position 137 is equipped with a standard 12-button touch-tone key set for transmitting touch-tone signals over the audio connection as described above. Also included are buttons or keys to move the cursor on the screen, a standard alphanumeric keyboard for inputing data into the teleconferencing operator support system computer and a plurality of special function keys.

Figure 4:
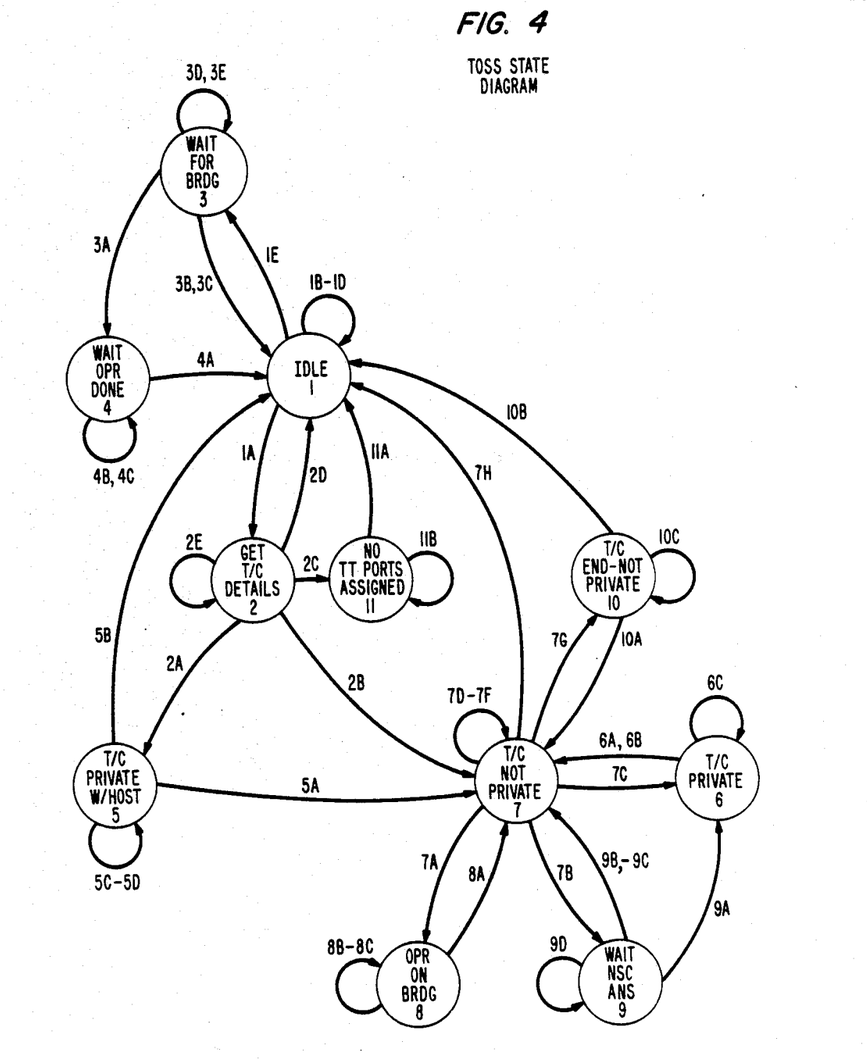
FIG. 4 is a state diagram representing the various states of the teleconference operator support system.

The actuation of a special function key may result in different system operations depending on what state the teleconferencing operator support system is in when a particular function key is actuated. To assist the reader in understanding the overall operation of the teleconferencing operator support system and the operator's position, a state diagram is presented in FIG. 4 which shows the major states that the teleconferencing operator support system assumes. FIG. 4, when viewed with reference to the table in Appendix A, illustrates the action taken and the next state the teleconferencing operator support system is put into as a result of an event received from the operator during a particular state.

For example, in state No. 1, which is the idle state, the operator can key in the conference identification which causes a "get teleconference details" message to be sent to the teleconferencing operator support system central control 120 and the system assumes state No. 2. If the conference identification is valid, ports have been assigned (i.e., the conferees are still on the bridge) and the operator had been summoned by the host and is in a privacy mode with the host, a "synchronization complete" message is sent to the network services complex. In addition, the conference details are displayed to the operator and the system is in state No. 5.

At this point the operator can actuate a REQUEST LOCATION key in preparation for adding a new line to the conference. This causes the cursor to move to a new location on the screen but the system is still in state No. 5. In the alternative, the operator can actuate an ADD CONFEREE key which causes the conferee who is presently in the privacy mode with the operator to be put back on the conference and the system would assume state No. 7. The operator can also actuate an OPERATOR DONE key which causes the operator to be disconnected from the conference bridge, the video display to be cleared from the screen and the system returned to the idle state No. 1.

In addition to the function keys, the terminal at position 137 is equipped with keys for moving the cursor to different positions on the screen. Thus, when the details of a conference are displayed on the screen in a manner similar to FIG. 3, the operator can move the cursor to one of the conference legs and actuate a function key to perform the function designated by that key on the line determined by the relative position of the cursor.

Certain of the function keys and the primary effect of their actuation will now be described. However, it will be appreciated that the precise sequence of events occurring as a result of the actuation of the function key depends on the particular state that the teleconferencing operator support system is in when the key is actuated.

A REQUEST LOCATION key is provided and actuation of this key moves the cursor on the video display terminal to a new location at the bottom of the screen to prepare the teleconferencing operator support system to receive the directory number of a new conferee. After actuating this key the operator would generally enter the telephone directory number, name, etc., of the new conferee using the alphanumeric keyboard at the video display terminal.

After the data of a new conferee is entered the operator may actuate a PLACE CALL key. In response to the actuation of this key, messages are sent to the network services complex causing a call to be established to a party designated by the operator and when the party answers, the party is put in a privacy mode with the operator. If the operator now actuates the ADD CONFEREE key, messages are sent to the network services complex causing the line that is in a privacy mode with the operator to be placed on the conference bridge.

The operator's position is also equipped with an OPERATOR DONE key which can be actuated during various stages of the call. In response to the actuation of the OPERATOR DONE key, control of the conference would be transferred back to the host with the appropriate announcement being played to the conferees. The video display terminal is cleared and the audio path to the operator's position is disconnected.

Should the operator elect to abandon a call in progress to a conferee, the operator can actuate a DISCONNECT key.

The operator's position is also equipped with JOIN CONFERENCE and LEAVE CONFERENCE keys which when actuated cause messages to be sent to the network services complex to place the operator on the bridge or to remove the operator from the bridge.

It should be noted that whenever command messages are sent to the network services complex from the teleconferencing operator support system, the network services complex performs certain routines with respect to the command sent, such as verifying the conference identification, verifying that the command is valid in view of the present state of the conference, etc. If the command message can be properly executed, the network services complex returns a "pass" message to the teleconferencing operator support system indicating the command will be carried out. If the command is invalid or cannot be executed, a "fail" message is returned from the network services complex and the teleconferencing operator support system displays the appropriate error message to the operator at position 137.

The operator has the capability of transferring the control of the conference to any party on the bridge. This is accomplished by moving the cursor on the video display terminal to the conference leg designated to be the new host and thereafter actuating the TRANSFER CONTROL key. Appropriate messages are sent to the network services complex, and the teleconferencing operator support system central control 120 updates the status of the legs involved.

In addition to the ability to transfer control, the operator can take any conferee off the bridge and converse with the conferee in a privacy mode. This is accomplished by moving the cursor on the video display to the selected conferee and actuating the key designated PRIVACY MODE. The privacy mode feature permits an operator to single out an unwanted conference leg and force the disconnect of that leg by actuating a DIS- CONNECT CONFEREE key. The operator can utilize this method if a defective leg is effecting the transmission or operation of the entire conference or to eliminate an unwanted conferee, etc.

Certain function keys are primarily used for conferences which the operator establishes, such as the REQUEST CONFERENCE key. When actuated this key causes a conference request form to be displayed on a video display terminal at position 137. This form consists of several pages which can be displayed individually by actuating the function key designated NEXT PAGE.

When the operator determines that assistance is no longer required, the operator actuates the OPERATOR DONE and NEXT CALL keys which clear the data display from the video display terminal and disconnect the voice path between the operator position and the network services complex, thus making the operator's position available to the automatic call distributor 118 for another call.

Figure 7:
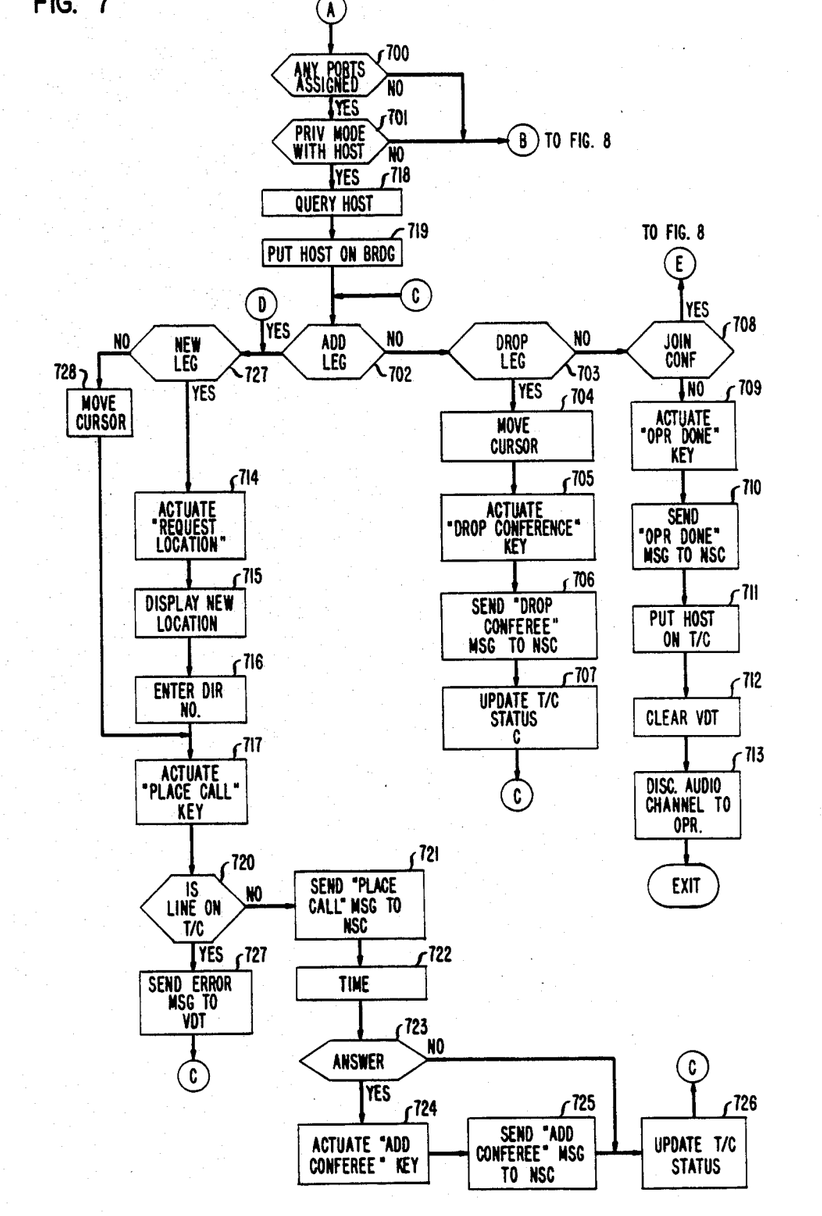

Returning to the call now being described, it has been assumed that the host has summoned an operator, the operator has answered the call and ordered the conference details displayed on the screen. As shown in FIG.7 central control 120 ascertains if any ports have been assigned to the conference and whether or not the conference state is in a privacy mode as shown in boxes 700 and 701. In the example being described, the conference is assumed to be active and the host has gotten off the bridge to summon the operator. Consequently, the host is in a privacy mode with the operator and the "yes" branch of box 701 is executed.

While in the privacy mode with the host, the operator can query the host to ascertain what assistance the host requires (box 718). For example, if the host wishes to add a conferee, the operator ascertains whether this a new conferee to be added or whether a conferee that has disconnected has to be reconnected to the bridge and then puts the host back on the bridge (box 719).

If the operator is requested to reconnect a dropped conferee, the operator moves the cursor (box 728) to the position on the screen that represents the dropped conference leg. The operator then actuates the PLACE CALL key as shown in box 717. If the host wishes the operator to add a new conferee to the conference, the operator actuates the REQUEST LOCATION key as shown in box 714. The cursor on the video display terminal is moved to the new vacant location on the screen (box 715) and the operator enters the directory number of the party that is to be added to the conference using the alphanumeric keyboard. The operator then actuates the PLACE CALL key as shown in box 717.

A check is then made by central control 120 in the teleconferencing support system to ascertain if the line that the operator is trying to add to the bridge is already on the bridge. If the line is already on the bridge an error message is displayed to the operator as set forth in box 727. If not, a "place call" message is sent by central control 120 to a network service complex processor 201. The "place call" message includes the conference identification, the directory number of the party being summoned, billing information, etc.

In response to this message, processor 201 issues orders to the toll switching system 202 to establish a connection to the party being summoned to the conference. Central control 120 now begins a timing function waiting for answer supervision from the called party as shown in box 723. When answer supervision is detected by the toll switching system and forwarded over a CCIS link 232, network services complex processor 201 sends an appropriate message to the teleconferencing operator support system via data links 262 and 263. In addition, processor 201 issues orders to the time slot interchange 224 and the audio bridge system 226 to connect the called party in a privacy mode with the operator's audio link. This is accomplished by establishing a two-party conference between the operator and the new conferee via audio bridge system 228. By utilizing the audio bridge to interconnect the operator with a conferee in the privacy mode, the echo cancellers, signal detectors and other apparatus of the audio bridge furnish the same high quality of transmission that is furnished to the conferees on a regular conference. Thus, the conferees do not experience any noticeable change in transmission quality while conversing with the operator or other conferees.

The operator can now inform the new conferee that the conferee is being summoned to the conference, and by actuating the ADD CONFEREE key (box 724) the teleconferencing operator support system sends an "add conferee" message to the network services complex and updates the status of the conference (box 726).

In response to the "add conferee" message the network services complex sends orders to the time slot interchange 224 and the audio bridge system 228 disconnecting the new conferee from a two-party conference with the operator and reconnecting the new conferee to the appropriate conference designated by the message.

The conference status now reflects the fact that the new conferee is on the conference and no longer in a privacy mode with the operator.

At this point in the progress of the call being described, the host has summoned the operator and requested that a new conferee be added to the conference. The operator fulfills this request by putting the host back on the bridge and causing a call to be originated from the network services complex to the new conferee. After conversing with the new conferee in the privacy mode, the operator adds the conferee to the designated conference.

If the host had requested that additional conferees be added to the bridge the operator can initiate calls to these conferees by once again actuating the REQUEST LOCATION key (box 714). The sequence of events represented by boxes 715-717 and 720-726 is then executed as previously described.

If the operator wishes to force a conferee off the bridge, the "no" branch of box 702 and "yes" branch of box 703 are executed. The operator then moves the cursor on the video display terminal (box 704) to a particular line that is on the conference. The operator can actuate the PRIVACY MODE key and converse with the conferee before actuating the DROP CONFEREE key. Actuation of the DROP CONFEREE key is interpreted by the teleconference operator support system which sends a "drop conferee" message to the network services complex processor 201. In response to this message processor 201 forces the disconnect of the line that was indicated by the cursor on the video display terminal and identified by the message transmitted from the teleconference operator support system.

Figure 8:
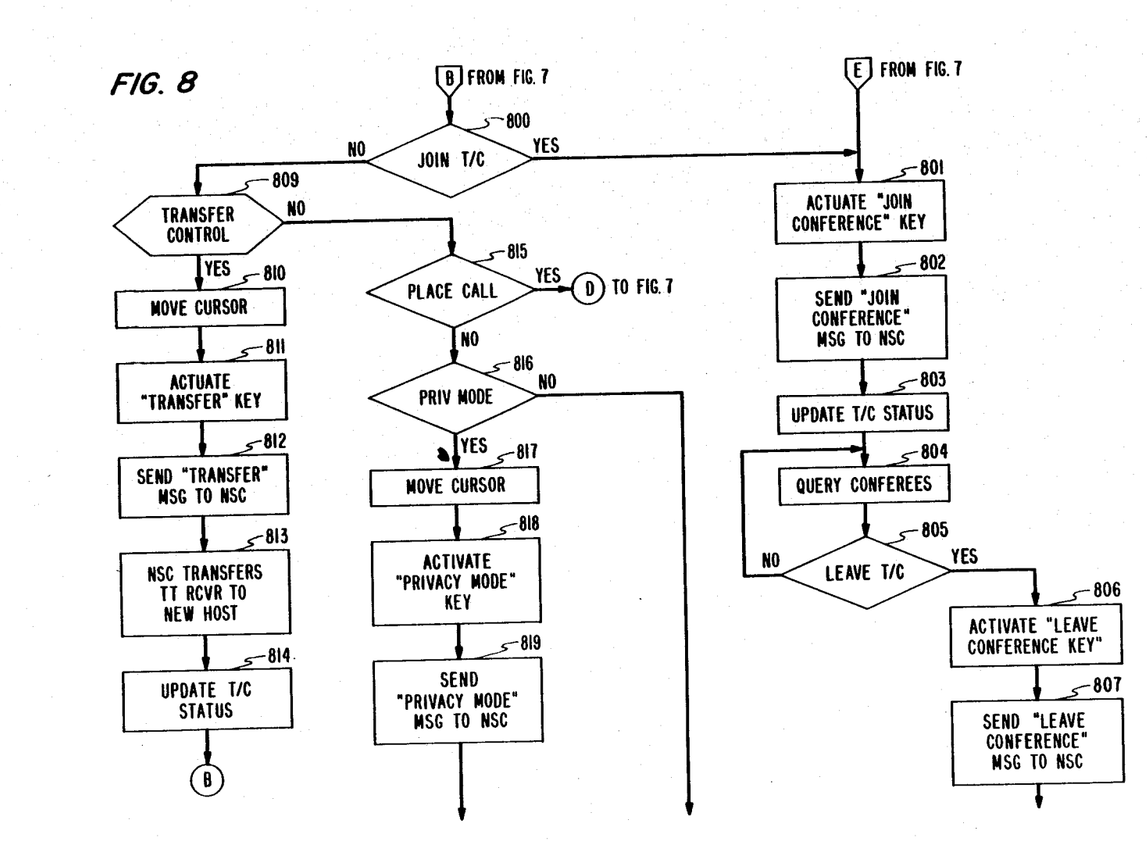
Figures 9, 10:
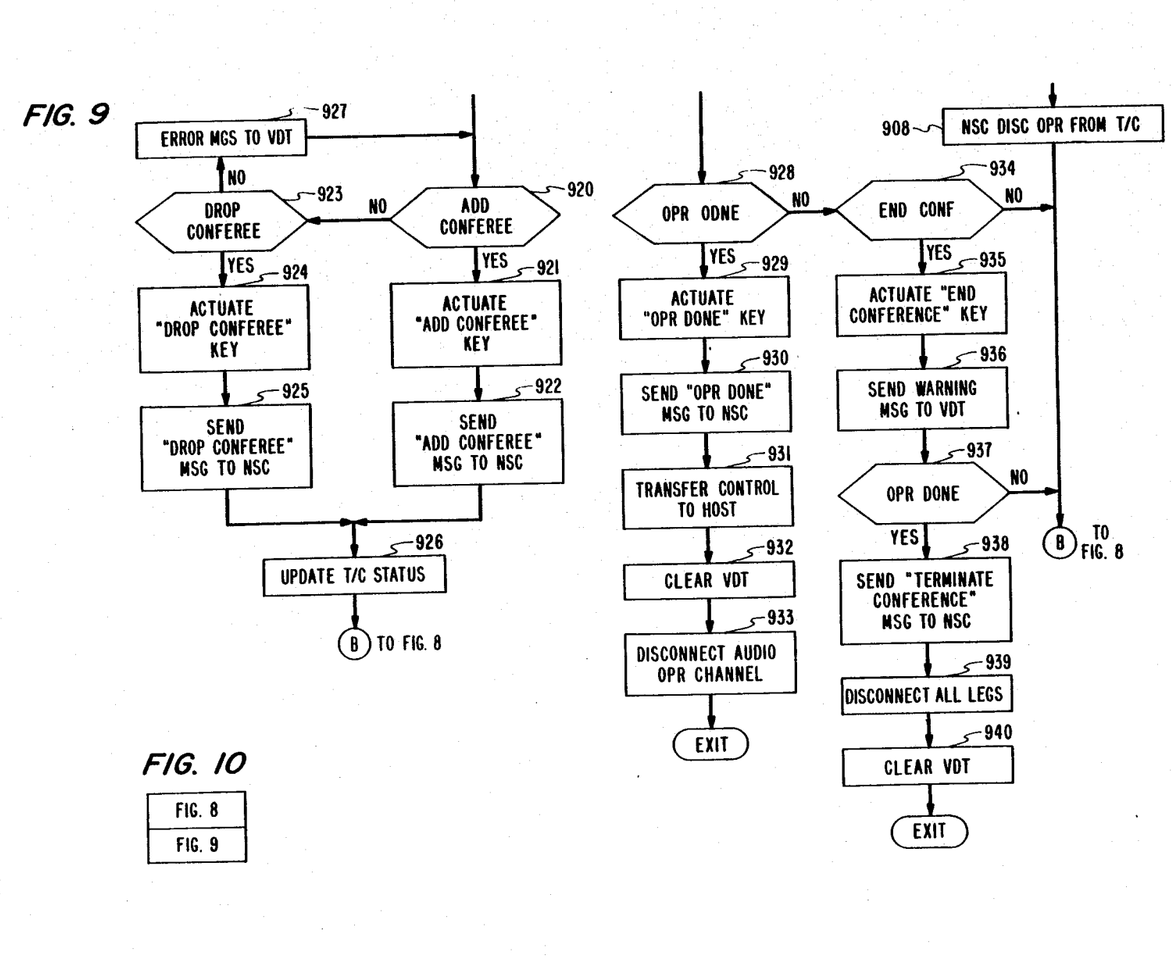

If the operator has completed the task of adding and/or dropping legs at the request of the host, the operator can join the conference by actuating the JOIN CONFERENCE key as shown in box 708. This causes a "join conference" message to be sent to the network services complex. The network services complex processor 201 responds by ordering time slot interchange 224 and the audio bridge 228 to put the operator's audio channel on the conference designated by the "join conference" message. While on the bridge the operator can ascertain if further operator assistance is required, but in order to take any action with respect to the lines connected to the bridge or summon additional lines, the operator must actuate a LEAVE CONFERENCE key which causes a "leave conference" message to be transmitted by the teleconferencing operator support system to the network services complex 200. These operations of joining and leaving the bridge are pictorially represented by boxes 800-807 in FIG. 8 and box 908 in FIG. 9 when FIGS. 8 and 9 are arranged according to FIG. 10.

While the operator is off the bridge, the operator can exercise many options with respect to the particular conference whose details are presented to the operator on the video display terminal. For example, the operator may wish to transfer control from the host to another conferee on the bridge. This is accomplished by moving the cursor on the video display terminal to the newly designated controller, i.e., host. The operator can then actuate the PRIVACY MODE key and converse with the new host before actuating the TRANSFER CONTROL key causing a "transfer control" message to be sent to the network services complex.

The network services complex responds to the "transfer control" message by disconnecting the touchtone receiver from the present host and connecting a receiver to the leg associated with the proposed host, and the central control 120 updates the conference details at the video display terminal to reflect which leg is now in control of the reference. This sequence of events is set forth in boxes 809-814 of FIG. 8.

If the operator desires to place a call to another conferee, the "yes" branch of box 815 is executed and the operator can actuate the REQUEST LOCATION key (box 714) to move the cursor on the video display terminal to a new line location. The sequence of events set forth in boxes 715-717 and 720-726 is then executed to establish a conference channel to the conferee whose directory number has been entered by the operator.

Should the operator desire to exercise other control over any of the conferees, the operator engages the conferee in a privacy mode. This is accomplished by the operator moving the cursor on the video display terminal to the line on the screen which identifies the conferee that the operator wishes to control and then operating the PRIVACY key. Actuation of the PRIVACY key causes a "privacy mode" message to be sent to the network services complex processor 201 (box 819) and this message includes the privacy mode command, the conference identification and the leg identification. The network services complex processor responds by issuing orders to the appropriate peripheral units causing the conferee leg to be transferred off the conference bridge and put on a two-party conference with the operator's audio channel.

Once in a privacy mode the operator can converse with the conferee, add the conferee back on the conference bridge or force the disconnect of the conferee as set forth in boxes 920-927 in FIG. 9. Depending on the action taken by the operator, the status of the teleconference is updated as shown in box 926.

The above method of singling out and controlling individual parties on a conference is particularly useful in conferencing where the identity of the conferee is ambiguous. For example, when a dial-up conference is established by a conference host, the host successively dials the directory number of each conferee, and the network services complex establishes calls to the conferees using these directory numbers. Some of the conferees, however, may be served by a private branch exchange that is not equipped with direct inward dialing. Consequently, the host merely dials the main directory number of the private branch exchange and is connected to the private branch exchange attendant who will then forward the call to the appropriate extension serving the desired conferee. Thus, on a host generated dial-up conference, the conference details recorded in the network services complex may only indicate that several legs are connected to the same directory number, i.e., the main directory number of the private branch exchange.

Of course, if the operator had established the dial-up conference, the operator could ascertain the identity of the conferee when the conferee responded and the operator could then enter in the extension number or the name of the conferee associated with each leg to avoid any ambiguity.

In either case, once an operator is summoned to assist on the conference, the full conference details are displayed to the operator and the operator can select a leg independently of the directory number used to establish a leg. For example, as shown in the table in FIG. 3, the second and third legs of the conference depicted therein were accessed using the same directory numbers, i.e., 212-555-1234. When the operator displays this information on the video display terminal of the position, the operator has individual access to these legs and can control them separately by moving the cursor on the terminal to each of the legs. Moreover, had an operator originally established the conference or once having identified the conferee on a particular leg, the operator can use the alphanumeric keyboard to enter the conferee's name, extension number, or some other notation to distinguish between the conferees.

Also, it should be noted in FIG. 3 that the leg status of each leg indicates that leg 1 is the conference host and in the privacy mode with the operator (PRIV), legs 2 and 3 are conferees that are presently connected to the bridge ("ONCF"), but that leg 4 is associated with a conferee that has disconnected ("DROPPED").

The ability to control individual conference legs from the operator's terminal can be advantageously used to remove unwanted conferees from a bridge, to single out defective conference legs that may interfere with the transmission on a bridge, establish a new host, reestablish legs that have dropped, etc.

Returning now to a description of other options available to the operator, as shown in FIGS. 8 and 9, if the operator does not wish to transfer control of the conference, place a new call or converse with a conferee in the privacy mode, the operator can disconnect from the conference by actuating the position OPERATOR DONE key. In response to the operation of this key, the teleconferencing operator support system sends an "operator done" message to the network service complex and clears the video display terminal.

At the network services complex the "operator done" message causes the processor thereat to transfer control of the conference back to the designated host and disconnect the audio channel from the operator's position.

Should the operator desire to end the conference the operator actuates the END CONFERENCE key (box 935). Before the conference is terminated the teleconference operator support system 161 displays a warning message on the video display terminal to caution the operator that the conference is about to be terminated. The operator must thereafter actuate the OPERATOR DONE key before the conference is terminated. In response to this sequence as depicted in boxes 935-939 a "terminate conference" message is sent from the teleconference operator support system to the network services complex which responds by disconnecting all legs of the conference that have been identified by the message.

In summary, an arrangement has been disclosed wherein an operator has been presented with the current status of an interactive special service facility whereby the operator can exchange data messages with the special service facility and exercise control over it.

In this particular embodiment, the special service facility is an interactive conference arrangement and the operator is apprised of all parties on the conference, their status, etc. The operator utilizes a terminal with a video display to view the status of the conference.

Of course, it will be understood that the arrangement described in the foregoing is merely illustrative of the application of the principles of the invention and numerous other arrangements may be devised by those skilled in the art without departing from the spirit and scope of the invention.

APPENDIX A

| Present State | Event Received | Action | Screen Action | Next State |
|---|---|---|---|---|
| 1. Idle | A Get T/C ID | Send "Get T/C Details" msg. to TOSS | | 2 |
| | B REQ. CONF. | | Display request form | 1 |
| | C DONE | | Clear | 1 |
| | D Other | | Display error msg. | 1 |
| | E ENTER | Send "Look for Bridge" msg. to NSC | Display "Wait" message | 3 |
| 2. Get details | A "T/C Info" msg. rec'd., ID valid, ports assigned opr. in "PRIV" with HOST" | Send "Sync Complete" msg. to NSC | Display T/C details | 5 |
| | B "T/C Info" msg. rec'd., ID is valid ports assigned & opr. not in "PRIV" | Send "Sync Complete" msg. to NSC | Display T/C Details | 7 |
| | C "T/C Info." msg. rec'd., ID valid & no ports assigned | Send "Sync Complete" msg. to NSC | Display T/C details | 11 |
| | D ID invalid | | Display error msg. | 1 |
| | E Other | | | 2 |
| 3. Waiting for Bridge Confirmation | A "Bridge Available" | Send "Save T/C Details" msg. | Display "Facilities Secured" msg. | 4 |
| | B "Bridge Unavailable" | | Displays "Facilities Not Available" | 1 |
| | C Cancel Form Entry | | Clear screen | 1 |
| | D DONE | | Displays "Not Ready" msg. | 3 |
| | E Other | | Display error msg. | 3 |
| 4. Waiting for Operator Done | A DONE | | Clear screen | 1 |
| | B Other | | Display error msg. | 4 |
| 5. T/C Details on Screen ΘPRIV" with HOST | A ADD | Sends "Add Conferee" msg. to NSC | Update status | 7 |
| | B DONE | (1) Sends "Done" msg. to NSC (2) Sends "Remove" msg. to TOSS | Clear screen | 1 |
| | C REQ LOC | | Display new line | 5 |
| | D Other | | Display error msg. | 5 |
| 6. T/C Details | A ADD & cursor on | Send "Add | Update line | 7 |

APPENDIX A-continued

| Present State | Event Received | Action | Screen Action | Next State |
|---|---|---|---|---|
| on Screen in "PRIV" mode | line with "PRIV" status | Conferee" msg. to NSC | status | |
| | B DROP & cursor on line with "PRIV" status | Send "Drop Conferee" msg. to NSC | Update line status | 7 |
| | C Other | | Display appropriate error message | 6 |
| 7. T/C Details on Screen Not in "PRIV" | A JOIN CONF. | Sends "Join Conference" msg. to NSC | Update operator status | 8 |
| | B PL CALL & cursor on line not "ONCF" or "PRIV" | Send "Place Call" msg. to NSC | | 9 |
| | C PRIV & cursor on line on T/C | Send "Private Mode" msg. to NSC | Updates line status | 6 |
| | D REQ LOC | | Displays new line | 7 |
| | E TRSF CNTL & cursor on line with "ONCF" status | Send "Transfer Control" msg. to NSC | Updates T/C status | 7 |
| | F Other | | Display error msg. | 7 |
| | G END CONF | | Displays "warning" msg. | 10 |
| | H DONE | (1) Send "Operator Done" msg. to TOSS (2) Send "Remove T/C Details" msg. to TOSS | Clears screen | 1 |
| 8. Operator on Conference | A LEAVE CONF | Send "Leave Conference" msg. to NSC | Updates operator status | 7 |
| | B REQ LOC | | Display new line | 8 |
| | C Other | | Display error msg. | 8 |
| 9. Waiting for NSC Answer | A Answer from NSC | | Update status to "PRIV" | 6 |
| | B DROP & cursor on same line as when PL CALL was hit | Send "Drop Conference" message | Update status to "DA" | 7 |
| | C NSC time out | | Update status to "DA" | 7 |
| | D Other | | Display error msg. | 9 |
| 10. Confirm End Conference Not in "PRIV" | A Any key other than DONE | | Removes "End Conference Warning" msg. | 7 |
| | B DONE | (1) Send "Terminate T/C" msg. to NSC (2) Send "Remove T/C Details" msg. to TOSS | Clear screen | 1 |
| 11. No Touch Tone Ports Assigned | A DONE | (1) Send "Terminate T/C" msg. to NSC (2) Send "Remove T/C Details" msg. to TOSS | Clear Screen | 1 |
| | B Other | | Display error msg. | 11 |

What is claimed is:

1. For use in a communication network having a conference arrangement for providing a plurality of individual multiport conference bridges,
   an operator position for providing assistance to conferee stations connected to any of said bridges, and
   a data processor associated with said operator position,
   an arrangement for coupling said position to said bridges comprising
   means responsive to the detection of a request for operator assistance from a particular one of said bridges for transmitting the particular bridge identity from said conference arrangement to said operator position and for transmitting a detailed status of said particular bridge to said data processor, said data processor comprising means responsive to the bridge identity received from said operator position for forwarding said bridge status to said position, and said operator position comprising means responsive to the receipt of said bridge status for displaying the bridge status to an operator thereat.

2. The invention set forth in claim 1 wherein said transmitting means comprises means for establishing an audio channel between said operator position and said conference arrangement, means for sending the identity of said particular bridge over said audio channel, and means responsive to a signal from said operator position for actuating said sending means.

3. The invention set forth in claim 1 wherein said operator position comprises means for causing said data processor to transmit messages to said conference arrangement.

4. The invention set forth in claim 1 wherein said particular conference bridge includes a conference port coupled to a host conferee station, and wherein is also provided means responsive to said bridge identity for interconnecting said host conferee port with said operator position to the exclusion of other conferee stations connected to said particular bridge.

5. For use in a communication network having a conference arrangement for providing a plurality of multiport conference bridges, an operator position for providing assistance to conferee stations connected to ports of said bridges, and a data processor associated with said operator position, an arrangement for transferring control of a particular one of said bridges from a conferee station connected thereto to said operator position comprising means responsive to a request signal from said particular bridge for establishing an audio channel between said operator position and said conference arrangement and for transmitting a data message to said processor, said data message including the identity of said particular bridge, the identity of each conferee station coupled thereto and the status of each conferee port of said particular bridge;

means responsive to an answer signal from said operator position for announcing the identity of said particular bridge over said channel to said operator position;

means at said operator position for forwarding said announced bridge identity to said processor; and means responsive to said announced bridge identity for forwarding the contents of said data message to said operator position for visual display thereat.

6. The invention set forth in claim 5 wherein the means for forwarding the contents of said data message comprises means for matching said announced bridge identity with the bridge identity in said data message.

7. The invention defined in claim 5 wherein said operator position comprises a video display terminal for displaying the contents of said forwarded data message and special function keys effective when actuated for transmitting messages to control said conference arrangement.

8. For use with a conference arrangement having a plurality of multiport customer-controlled bridges and processor means for interconnecting the ports with customer stations under the control of a host one of said stations, a method for providing operator assistance for individual ones of said bridges comprising the steps of sending the identity of a particular bridge to an operator position remote from said conference arrangement when said particular bridge requires operator assistance;

compiling data concerning the status of said particular bridge including the identity of the bridge, the identity of individual customer stations connected to the bridge and an indication of the host station in control of the bridge;

sending said data to said operator position when the identity of said particular bridge is received from said operator position;

displaying the compiled data at said operator position; and transferring control of said particular bridge from said host station to said operator position.

9. The method defined in claim 8 wherein the step of transferring control includes the step of establishing a private communication channel between said operator position and said host station.

10. The method defined in claim 8 wherein each said conference bridge is responsive to a plurality of signals transmitted by the host station for assuming a state corresponding to each signal, and wherein the step of compiling data includes the step of ascertaining the last signal transmitted by said host station.

11. The method defined in claim 8 wherein the step of detecting when a particular bridge requires operator assistance comprises the step of indicating when the host station requests assistance and indicating when the host station has disconnected from the bridge and wherein the compiled data includes one of the detected indications.

12. The method set forth in claim 8 wherein the step of displaying the compiled data comprises the step of establishing voice and data paths between the particular bridge and the operator position and announcing over the voice path to an operator at said position the identity of said particular bridge.

13. The method set forth in claim 12 wherein the step of displaying the compiled data also includes the step of generating a visual representation of said data in response to a request signal from the operator position.

14. For use with a plurality of interactive special service circuits each said circuit being controllable by a customer terminal and adapted to assume any one of a plurality of distinct states in response to a control signal transmitted from said customer terminal and adapted to prompt said customer terminal as to what subsequent control signal is to be transmitted from said customer in accordance with the particular control signal received while said circuit is in a specific state, a method of providing operator assistance to said customer terminal comprising the steps of detecting when said circuit is requesting assistance from said operator, assembling a data message at said circuit including the state said circuit was in when the request for assistance was detected, the identity of the last signal transmitted by said customer terminal and the identity of any signal permitted to be transmitted by said customer terminal, establishing voice and data links between said customer terminal and a terminal associated with said operator, transmitting said data message over said data link from said customer terminal to said operator terminal, generating a visual representation of said data message at said operator terminal, and rearranging said circuit to interact with control signals from said operator terminal.

* * * * *